(12) United States Patent
Jian et al.

(10) Patent No.: US 11,528,400 B2
(45) Date of Patent: Dec. 13, 2022

(54) IMAGE-PROCESSING MICROPROCESSOR FOR SUPPORTING AN APPLICATION PROCESSOR AND MULTIPLE CAMERAS

(71) Applicant: FUZHOU ROCKCHIP ELECTRONICS CO., LTD., Fujian (CN)

(72) Inventors: Huan Jian, Fujian (CN); Ning Luo, Fujian (CN); Shanxu Zhang, Fujian (CN); Jiang Han, Fujian (CN); Shengqin Zhang, Fujian (CN); Shuai Zhang, Fujian (CN); Yongle Lai, Fujian (CN)

(73) Assignee: FUZHOU ROCKCHIP ELECTRONICS CO., LTD., Fujian (CN)

( * ) Notice: Subject to any disclaimer, the term of this patent is extended or adjusted under 35 U.S.C. 154(b) by 0 days.

(21) Appl. No.: 16/754,752

(22) PCT Filed: Nov. 8, 2018

(86) PCT No.: PCT/CN2018/114547
§ 371 (c)(1),
(2) Date: Apr. 9, 2020

(87) PCT Pub. No.: WO2019/091423
PCT Pub. Date: May 16, 2019

(65) Prior Publication Data
US 2020/0314321 A1 Oct. 1, 2020

(30) Foreign Application Priority Data

Nov. 8, 2017 (CN) .......................... 201711091202.1
Nov. 22, 2017 (CN) .......................... 201711171819.4
Dec. 28, 2017 (CN) .......................... 201711464053.9

(51) Int. Cl.
*H04N 5/228* (2006.01)
*H04N 5/232* (2006.01)
*H04N 5/247* (2006.01)

(52) U.S. Cl.
CPC ..... *H04N 5/23203* (2013.01); *H04N 5/23229* (2013.01); *H04N 5/247* (2013.01)

(58) Field of Classification Search
CPC . H04N 5/23203; H04N 5/23229; H04N 5/247
(Continued)

(56) References Cited

U.S. PATENT DOCUMENTS 9,229,526 B1 * 1/2016 Neglur .................. G06F 3/0304
10,101,987 B2 * 10/2018 Riley ........................ G06F 8/65
(Continued)

*Primary Examiner* — Usman A Khan

(57) ABSTRACT

An image-processing unit for an electronic device is disclosed. The image-processing unit may include a digital signal processor (DSP), a first control interface configured for receiving an AP-instruction from an application processor (AP) external to the image-processing unit, and a second control interface configured for transmitting an intermediary-instruction generated by DSP based on the AP-instruction. The image-processing unit may further include a first data interface configured for receiving sensor-data generated in response to the intermediary-instruction by a sensor external to the image-processing unit, and a second data interface configured for bi-directionally transmitting intermediary-data to the AP or receiving AP-data from the AP, wherein the intermediary-data is generated by the DSP based on the sensor-data.

13 Claims, 5 Drawing Sheets

(58) Field of Classification Search
USPC .................................................. 348/222.1
See application file for complete search history.

(56) References Cited

U.S. PATENT DOCUMENTS

| | | | | |
|---|---|---|---|---|
| 2006/0139460 | A1* | 6/2006 | Ozaki | H04N 5/235 |
| | | | | 348/222.1 |
| 2008/0177507 | A1* | 7/2008 | Mian | G06F 15/7867 |
| | | | | 702/189 |
| 2010/0302391 | A1* | 12/2010 | Shinozaki | H04N 5/23203 |
| | | | | 348/211.14 |
| 2012/0075482 | A1* | 3/2012 | Voss | H04N 5/272 |
| | | | | 348/207.1 |
| 2018/0089808 | A1* | 3/2018 | Ling | G06T 1/00 |
| 2018/0189229 | A1* | 7/2018 | Desoli | G06N 3/0454 |
| 2018/0330466 | A1* | 11/2018 | Basso | G06K 9/00221 |

* cited by examiner

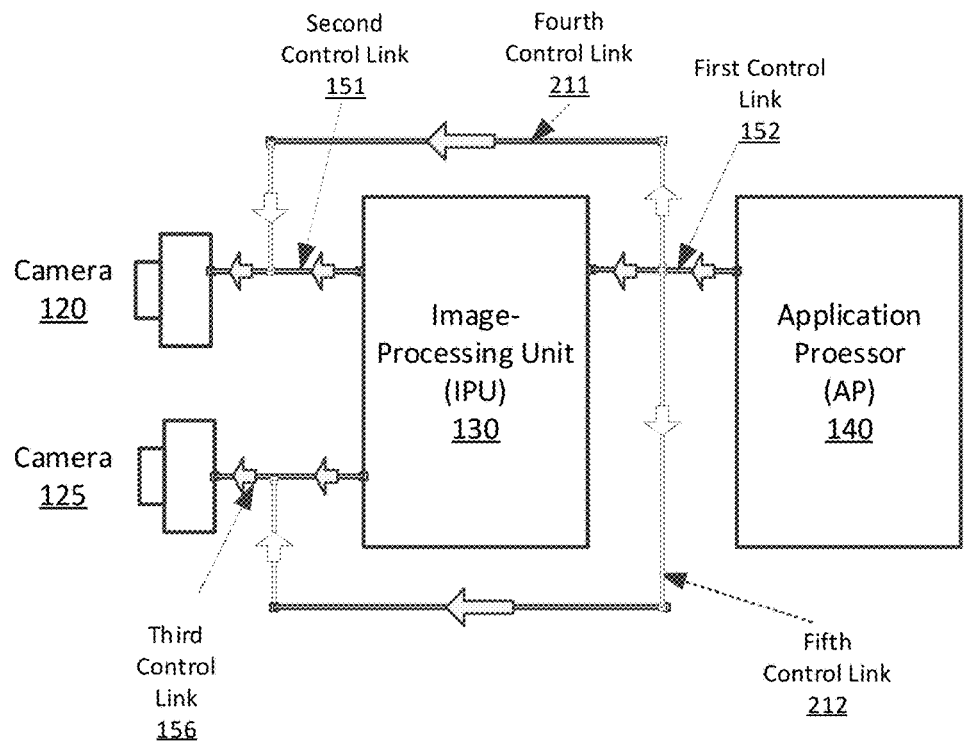
Figure 2-A
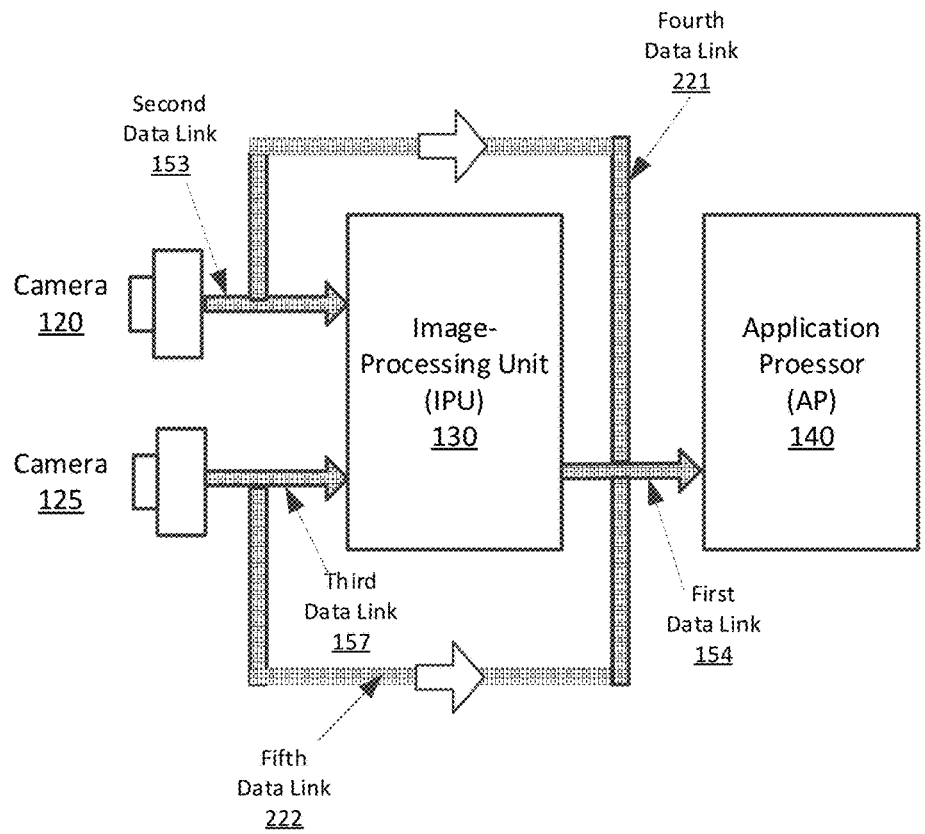
Figure 2-B

IMAGE-PROCESSING MICROPROCESSOR FOR SUPPORTING AN APPLICATION PROCESSOR AND MULTIPLE CAMERAS

CROSS-REFERENCE

This is a Sect. 371 National Stage of a PCT International Application No. PCT/CN2018/114547, filed on Dec. 8, 2018, which claims priority to a Chinese Patent Application No. 201711091202.1, filed on Nov. 8, 2017, a Chinese Patent Application No. 201711171819.4, filed on Nov. 22, 2017, and a Chinese Patent Application No. 201711464053.9, filed on Dec. 28, 2017, all of which are hereby incorporated by reference in its entirety, including any appendices or attachments thereof, for all purposes.

TECHNICAL FIELD

The present disclosure is related to an image-processing microprocessor for supporting an application processor and multiple cameras, and methods to utilize the image-processing microprocessor to enhance images captured by the multiple cameras in response to instructions provided by the application processor.

BACKGROUND

Today's portable electronic devices, such as smartphones, tablets, or wearable electronic devices, are commonly equipped with camera modules, which contain compatible hardware and software modules that allow the portable electronic devices to take photos and videos. As technologies (e.g., pixel resolutions) associated with these camera modules are getting more advanced, consumers' demands for better image qualities in terms of e.g., clarity, color, distortion, are also getting higher. For example, there are increasing demands for portable electronic devices that can produce high-quality images and provide advanced image-capturing capabilities.

In conventional design, the image-processing functionalities of a portable electronic device are often provided by its main application processor (AP). In other words, the AP and the camera module may be directly connected via control links and data links. As all the image-related operations have to be issued by the AP, and all data generated by the camera module have to be processed by the AP, the overall performance of the portable electronic device, as well as its image-processing capabilities, may be restricted by the AP.

BRIEF DESCRIPTION OF THE DRAWINGS

FIG. 2-A shows an electronic device architecture that allows multiple cameras being simultaneously controlled by an image-processing unit and an application processor;

FIG. 2-B shows an electronic device architecture that allows an application processor and an image-processing unit to simultaneously process image data generated from multiple cameras;

Figure 1:
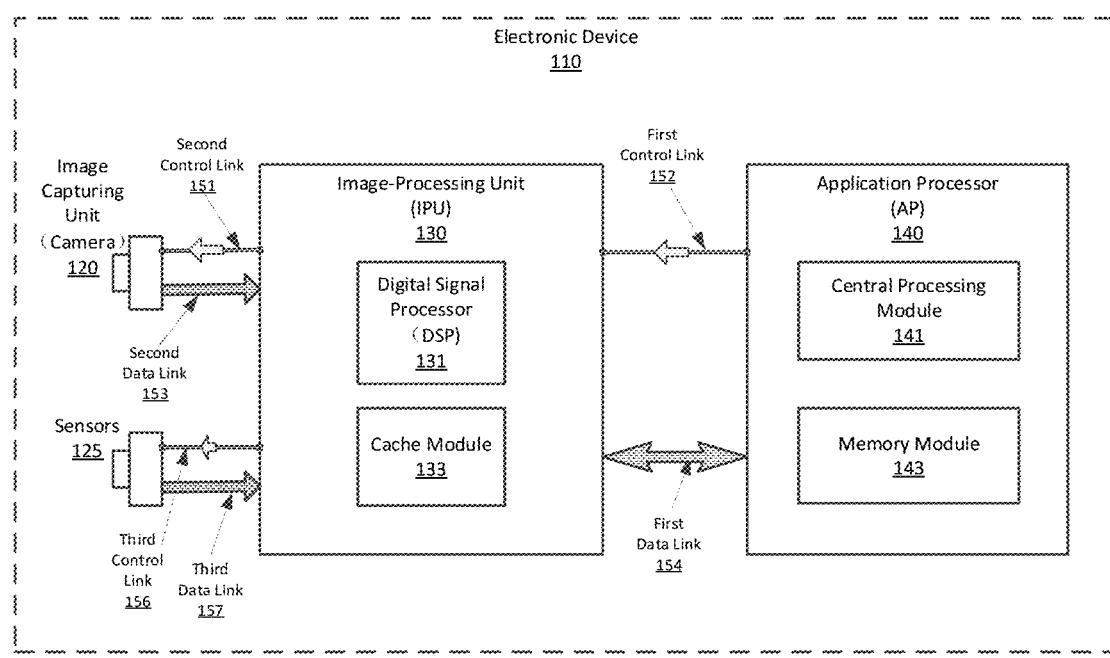
FIG. 1 shows a schematic diagram of an image-processing microprocessor that is configured to connect with multiple cameras and an application processor.

all arranged in accordance to at least one or more embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 shows a schematic diagram of an image-processing microprocessor that is configured to connect with multiple cameras and an application processor, according to the certain embodiments of the present disclosure. The electronic device 110 may be any portable or non-portable electronic device having photographing and/or video-graphing capabilities. The electronic device 110 may typically be configured as a mobile phone, smart phone, tablet, laptop, digital camera, video camera, and any other wearable electronic device such as a smart watch, smart wristband, smart glasses, etc.

In some embodiments, the electronic device 110 may include various hardware modules and electronic components such as image-capturing unit 120, sensors 125, image-processing unit 130, and application processor 140. The image-capturing unit 120 may be an electronic module/component having a function of acquiring an image/video, such as a camera or an image-capturing lens and sensor assembly. The image-capturing unit 120 may receive an external control instruction. In response to the external control instruction, the image-capturing unit 120 may collect or set an image-capturing parameter, adjust its internal optical structure and mechanism based on the image-capturing parameter, and acquire/capture an image/video as image data. In addition, the image-capturing unit 120 may generate and transmit the image data in response to the external control instruction. For convenience purposes, the image-capturing unit 120 may also be referred to as the camera 120.

In some embodiments, each of the sensors 125 may be an electronic module/component that can detect/sense a specific type of external or environmental information (e.g., light wave, motion, force, humidity, etc.) For example, the sensor 125 may be an acceleration sensor for detecting external forces applied to the electronic device 110. The sensor 125 may also be a sound sensor that can capture sound waves from the surrounding environment in which the electronic device 110 is located. The sensor 125 may receive an external control instruction, and in response to the external control instruction, may collect or set a parameter, adjust its internal configuration based on the parameter, perform a specific information gathering operation, and/or generate sensor data. In addition, the sensor 125 may transmit the sensor data in response to the external control instruction. For convenience purposes, the sensor 125 may also be another one of the cameras similar to the camera 120.

In some embodiments, the image-processing unit 130 may be an electronic component capable of controlling the camera 120 and/or the sensors 125, and processing the control instructions as well as image/video data. Specifically, the image-processing unit 130 may be configured with an instruction-processing function and a data-processing function. The "instruction-processing function" may refer to the processing of the control instructions for controlling the camera 120 and/or the sensors 125. The "data-processing function" refers to the processing of image data generated by the camera 120 and/or the sensors 125, as well as the data provided by the application processor 140. In the following description and in figures, the image-processing unit 130 may also be referred to as the IPU 130.

In some embodiments, the application processor 140 may be an electronic component capable of controlling the camera 120 and the IPU 130. As shown in FIG. 1, the IPU 130 may be a microprocessor or computer chip existing separate and independent from the application processor 140. The application processor 140 may be an Application Processor (AP), a Central Processing Unit (CPU), or a System on Chip (SoC). For example, the application processor 140 may be an INTEL® CPU, a QUALCOMM® SoC chip, or a MEDIATEK® SoC chip. In the following description and in figures, the application processor 140 may be referred to as the AP 140.

In some embodiments, the IPU 130 may include a digital signal processor 131 and a cache module 133. The digital signal processor 131 may be any hardware component/module having digital data-processing capabilities, such as a Digital Signal Processor (DSP). The cache module 133 may be a hardware storage module (such as flash, RAM, ROM, cache, etc.) that provides various data storages for the IPU 130. The AP 140 may include, among other modules, a central processing module 141 and a memory module 143. The central processing module 141 may be any hardware module (e.g., CPU, DSP, etc.) having computational processing capabilities. Example of the central processing module 141 may include ARM® core or INTEL® CPU, etc.

In some embodiments, the memory module 143 may be a hardware storage module that provides various data storage functions to the AP 140. The memory module 143 may be implemented using the same or different hardware storage modules. For ease of description, the cache module 133 may be referred to as a "first storage module"; the data storage module 143 may be referred to as a "second storage module."

In some embodiments, the IPU 130 may be connected with the AP 140 through a first control link 152 and a first data link 154, the IPU 130 may be connected with the camera 120 through a second control link 151 and a second data link 153, and the IPU 130 may be further connected with at least one sensor 125 via a third control link 156 and a third data link 157. In some embodiments, the "control link" or "data link" may be a wired electronic connection for transmitting electronic signals and data. Specifically, "control link" may refer to an electronic connection for transmitting one or more control instructions for controlling the camera 120 and/or the sensors 125, and "data link" may refer to an electronic connection for transmitting one or more sets of data associated with the camera 120 and/or sensors 125.

In some embodiments, based on various configurations, a link can be designed for one-way (unidirectional) or two-way (bi-directional) transmission. In the unidirectional transmission situation, the first end of the link may be connected to the "transmitting interface" of a first processing unit, and the second end of the link may be connected to the "receiving interface" of a second processing unit. The electronic signal or data may be sent from the transmitting interface of the first processing unit to the first end of the link, and then to the receiving interface of the second processing unit via the second end of the link. In the bidirectional transmission situation, according to the direction of transmission, the transmitting interface may be the interface that transmits data to the link, and the receiving interface may be the interface that receives data from the link.

In some embodiments, multiple electronic connections may form a single control link or a single data link, and multiple control links or data links may also share a common link. Further, one link may be used as a control link for a period of time, and used as a data link in another time period. In the following Figures, the arrows shown on the data links and control links may indicate the direction of the data transmission through these links. In some embodiments, the first data link 154 may be shown having bi-directional arrows, indicating data may be transmitted from the IPU 130 to the AP 140, or from the AP 140 to the IPU 130.

In some embodiments, the AP 140 may have one or more "instruction-transmitting-interfaces" for transmitting various control instructions and one or more "data-receiving-interfaces" for receiving various data. The camera 120 or each sensor 125 may have an "instruction-receiving-interface" for receiving various control instructions, and a "data-transmitting-interface" for transmitting various kinds of image data. In some configurations, the AP 140 may be directly connected to the camera 120 or a sensor 125 via a control link and a data link. In these situations, the control instructions issued by the AP 140 via its instruction-transmitting-interface may be directly transmitted through the control link to the instruction-receiving-interface of the camera 120 (or the sensor 125), and the image data collected by the camera 120 (or the sensor 125) may be directly delivered via its data-transmitting-interface through the data link back to the AP 140 via its data-receiving-interface. In other words, by directly connecting to the camera 120 (or the sensor 125), the AP 140 may be configured to control the camera 120 (or the sensor 125) by transmitting control instructions through the control link, and may receive images captured by the camera 120 (or the sensor 125) via the data link.

In some embodiments, the IPU 130 may be placed between the camera 120 (and/or the sensors 125) and the AP 140 for processing and transmitting the control instructions sent by the AP 140 and the data collected by the camera 120 (and/or the sensors 125). Specifically, the IPU 130 may have one or more "instruction-receiving-interfaces" for receiving control instructions, one or more "instruction-transmitting-interfaces" for transmitting control instructions, one or more "data-receiving-interfaces" for receiving data, and one or more "data-transmitting-interfaces" for sending data. As shown in FIG. 1, the first control link 152 may be connected to the instruction-transmitting-interface of the AP 140 and the instruction-receiving-interface of the IPU 130. The second control link 151 may be connected to a first instruction-transmitting-interface of the IPU 130 and the instruction-receiving-interface of the camera 120. The second data link 153 may be connected to the data-transmitting-interface of the camera 120 and a first data-receiving-interface of the IPU 130. The third control link 156 may be connected to a second instruction-transmitting-interface of the IPU 130 and the instruction-receiving-interface of the sensor 125. And the second data link 153 may be connected to the data-transmitting-interface of the sensor 125 and a second data-receiving-interface of the IPU 130.

In some embodiments, the first data link 154 may be connected to the data-transmitting-interface of the IPU 130 and the data-receiving-interface of the AP 140 for transmitting data from the IPU 130 to the AP 140. Since the first data link 154 may be bi-directional, when data are transmitted from the AP 140 to the IPU 130, the first data link 154 may be connected to a data-transmitting-interface of the AP 140 and a third data-receiving-interface of the IPU 130. For convenience purposes, in the following descriptions, the sensors 125 may be treated substantially equivalent to the camera 120 with respect to its functionalities and communications with the IPU 130 and the AP 140. In other words, the electronic device 110 may be deemed having two or more cameras 120, each of which may be identical to or different from the other cameras 120.

In some embodiments, the control instructions generated and/or sent by the AP 140 may be referred to as "AP-instructions" (or "first control instructions"), which include instructions for controlling the cameras 120 and for setting and retrieving various image capturing parameters. The AP-instructions may also include instructions for controlling the image-processing functions provided by the IPU 130 and its internal operations. The control instructions generated and sent by the IPU 130 may be regarded as "intermediary-instructions" (or "second control instructions") including instructions for controlling the cameras 120 and various image-capturing parameters.

In some embodiments, the IPU 130 may generate the intermediary-instruction in accordance with the AP-instruction. The intermediary-instruction may also include partial or all of one or more AP-instructions, and may include instructions derived from the AP-instructions, instructions generated independent of the AP-instructions, and/or the combinations of above. For example, the IPU 130 may generate an intermediary-instruction for performing various operations such as repetition, copy, add, modify, replace, delete, and the like, or may not generate an intermediary-instruction in view of an AP-instruction received from the AP 140.

In some embodiments, the data generated or transmitted from the cameras 120 may be referred to as "camera-data" (or "first data"), which may include captured images and the various image-capturing parameters associated with the images. Likewise, the data generated or transmitted from the IPU 130 may be referred to as "intermediary-data" (or "second data"), which may include data derived from the camera-data supplied by the camera 120 (and/or the sensors 125), and may include data independently generated by the IPU 130. In some situations, the data originated or transmitted from the AP 140 may be referred to as "AP-data" (or "third data"), which may include data received by the AP 140 from the camera 120 (and/or the sensors 125) and/or the IPU 130, and subsequently being transmitted from the AP 140.

In some embodiments, the intermediary-data may or may NOT be generated based on the camera-data. For example, the IPU 130 may generate intermediary-data by performing repeating, adding, modifying, deleting, deleting, and the like operations on the camera-data. The intermediary-data may also be independent of the camera-data, e.g., the IPU 130 does not generate the intermediary-data based on the camera-data. In some embodiments, the camera-data includes one or more image frames ("first image"), the IPU 130 may optimize the images, and generates the intermediary-data which also includes one or more image frames ("second image"). The optimization of the first image by the IPU 130 includes operations such as translation, rotation, combining, division, de-noising, and the like. Preferably, the first image and the second image may be in the same format, such as JPG or RAW.

In some embodiments, the AP 140 may transmit an AP-instruction from its instruction-transmitting-interface either to the IPU 130 or to the cameras 120. And the data received by the AP 140 through its data-receiving-interface may be from the IPU 130 or from the cameras 120. In other words, the AP 140 sends various instructions to the IPU 130 through the first control link 152, as if it sends these instructions directly to the cameras 120. And the AP 140 receives various data from the IPU 130 through the first-data link 154, as if the AP 140 receives the data directly from the cameras 120. Thus, from the perspective of AP 140, the IPU 130 may be treated as a camera 120. In other words, the IPU 130 may be compatible with a camera 120 in terms of supporting and serving the image capturing and processing requirements of the AP 140.

In some embodiments, the control instructions received by the cameras 120 by its instruction-receiving-interface may nevertheless be transmitted from the IPU 130 or the AP 140. And the camera-data sent from the cameras 120 through its data-transmitting-interface may be transmitted to the IPU 130 or to the AP 140. Thus, from the perspective of the cameras 120, the IPU 130 may be treated as an AP 140. That is, the cameras 120 receive various control instructions from the IPU 130 through the second control link 151 and/or the third control link 156, as if they receive these control instructions directly from the AP 140. And the cameras 120 send the camera-data to the IPU 130 through the second data link 153 and/or the third data link 157, as if the cameras 120 directly send such camera-data to the AP 140.

In some embodiments, for an AP 140 originally designed to support direct connecting with a single camera via a control link and a data link, the IPU 130 may be added into such a design by being connected with two or more cameras 120 and the AP 140 using the control links and data links as illustrated by FIG. 1. In other words, FIG. 1's design indirectly enables the AP 140 to support multiple cameras 120. Thus, the IPU 130 may greatly enhance the electronic device 110's image processing functionalities, in the mean times requiring minimum amount of modifications and producing no impacts to the cameras 120 or the AP 140.

In some embodiments, the IPU 130 receives the AP-instruction issued from the AP 140 through the first control link 152, generates an intermediary-instruction according to the AP-instruction, and sends the intermediary-instruction through the second control link 151 to the camera 120 and/or through the third control link 156 to the camera 125. For example, the AP-instruction or the intermediary-instruction may be used to adjust a single camera 120's aperture size, shutter speed, exposure parameter, ISO setting, white balance, and may be used to adjust the size of the image to be acquired by the single camera 120 or control the single camera 120 to capture an image or video. Based on the received AP-instruction, the IPU 130 may generate a first intermediary-instruction for the camera 120, and a second intermediary-instruction for the camera 125. The first intermediary-instruction may be identical to or different from the second intermediary-instruction. Afterward, the IPU 130 may transmit these two intermediary-instructions to the cameras 120 and 125 simultaneously, selectively, or one after the other. Alternatively, the IPU 130 may selectively transmit one of the two intermediary-instructions to either cameras 120 or camera 125, but not transmitting both intermediary-instructions.

In some embodiments, based on the received intermediary-instructions, each of the cameras 120 and 125 may manipulate its own internal image-capturing mechanisms, and respectively generate/transmit camera-data (which may include one or more captured images, the image parameters, and/or various parameters of the camera 120). Specifically, the camera 120 may generate and transmit a first camera-data to the IPU 130 through the second data link 153, and the camera 125 may generate and transmit a second camera-data to the IPU 130 via the third data link 157. In some embodiments, the cameras 120 and 125 may transmit the two camera data simultaneously, selectively, or one after the other. Alternatively, one of the cameras 120 and 125, but not both, may transmit its respective camera data to the IPU 130. Afterward, the IPU 130 may then generate intermediary-data based on the received two camera-data, and transmit the intermediary-data to the AP 140 through the first data link 154. The intermediary-data received by the AP 140 via the first data link 154 may be used as a direct response to the AP-instruction sent from AP 140 via the first control link 152.

In some embodiments, in an architecture in which an AP 140 directly connects and controls a single camera 120, the AP 140 needs to send an AP-instruction that is fully supported by the camera 120 in order to effectively manipulate the camera 120. Thus, for different models of the camera 120 or multiple cameras 120 and 125, the AP 140 needs to support multiple versions of AP-instructions corresponding to the different makes and models of the cameras 120 and 125. In FIG. 1's architecture, the IPU 130 may be configured to provide customized supports to different makes and models of the cameras 120 and 125, while the AP 140 only needs to issue a standard, generic AP-instruction. In other words, the IPU 130 may translate the generic AP-instruction into different corresponding intermediary-instructions for the different makes and models of the cameras 120 and 125. In this way, the IPU 130 may help the AP 140 to achieve customized supports of a wider range of makes and models of cameras 120 and 125 than the AP 140 by itself.

In some embodiments, the IPU 130 may be configured to assist the AP 140 in controlling the camera 120 with an AP-instruction that is not directly supported by the camera 120 or the camera 125. In other words, taking the camera 120 as an example, if the AP 140 transmits an unsupported AP-instruction directly to the camera 120, the camera 120 may either not understand the AP-instruction or cannot perform the operation as required by the AP-instruction. In FIG. 1's case, the IPU 130 may generate an intermediary-instruction that is supported by the camera 120 based on the unsupported AP-instruction. Afterward, the camera 120 may transmit the camera-data captured based on the intermediary-instruction to the IPU 130, the IPU 130 may process the camera-data, and generate/transmit the intermediary-data to the AP 140 as a response to the AP-instruction. In this way, the IPU 130 may help the AP 140 to support a camera 120 that it cannot support by itself.

In some embodiments, the intermediary-instructions transmitted by the IPU 130 to the camera 120 or the camera 125 may be the same as the AP-instruction the IPU 130 received from the AP 140. For example, the AP-instruction issued by the AP 140 may be an instruction to acquire the image-capturing parameters of the camera 120, the IPU 130 may generate an intermediary-instruction (or directly copy the AP-instruction as the intermediary-instruction), and send this intermediary-instruction to the camera 120.

In some embodiments, the IPU 130 may process the AP-instruction issued by the AP 140, and generate an intermediary-instruction that is different from the AP-instruction. For example, the AP-instruction issued by the AP 140 may be an instruction to focus the camera 120. The IPU 130 may generate based on the AP-instruction multiple intermediary-instructions which include instructions that require the camera 120 to adjust the aperture and shutter speed prior to the adjusting of the focus of the camera 120. Further, the IPU 130 may generate based on the AP-instruction multiple intermediary-instructions for both the camera 120 and the camera 125. Thus, the IPU 130 may assist the AP 140 in enhancing the functionalities (such as automatic/semi-automatic aperture adjustment or shutter speed adjustment) of the camera 120 and the camera 125, which the AP 140 by itself may not have the capability to provide.

In some embodiments, without the IPU 130 (i.e., the architecture in which the camera 120 and the AP 140 are directly connected), if needs to combine multiple images into a single image, the AP 140 may need to issue multiple AP-instructions to the camera 120, with each of the AP-instructions controlling the camera 120 to capture one corresponding image. After acquired the multiple images according to these AP-instructions, the camera 120 may then transmit these images to the AP 140, for it to perform a combining process to generate a single image from these multiple images. With the help of the IPU 130 in an architecture shown in FIG. 1, the AP 140 only needs to send a single AP-instruction "capturing a multi-image-composed image" to the IPU 130. Even though the camera 120 may NOT directly support such an AP-instruction, the IPU 130 may generate based on this AP-instruction multiple intermediary-instructions, each of which may control the camera 120 or the camera 125 to capture a single image. The camera 120 and the camera 125 may then respectively capture multiple images after receiving these intermediary-instructions, and transmit the acquired multiple images to the IPU 130. Afterward, the IPU 130 may then combine/merge the multiple images into a single composition image, and transmit the single composition image to the AP 140 in response to the AP-instruction. In this way, the IPU 130 may help the AP 140 to implement more complex image capturing and processing functions that are not supported by the camera 120.

In some embodiments, the AP 140 may issue a "capturing image" AP-instruction, which may or may not be supported by the camera 120. In this case, without awareness by the AP 140, the IPU 130 may generate multiple intermediary-instructions based on this AP-instruction, in order to control the camera 120 and/or the camera 125 to capture multiple images. After acquired the multiple images according to these intermediary-instructions, the camera 120 and the camera 125 may transmit the multiple images to the IPU 130. The IPU 130 may combine these images into one image for noise-reduction or image enhancement, and then transmit the resulting image to the AP 140 as a response to the AP-instruction. In this way, the IPU 130 can not only effectively reduce the burden on the AP 140, but also perform an image processing function that the AP 140 is not aware of.

In some embodiments, the IPU 130 may generate additional control instructions (or "third control instructions") based on the camera-data received from the camera 120 and/or the camera 125. Specifically, the IPU 130 may generate one or more first intermediary-instructions and send them to the camera 120 and the camera 125 after receiving an AP-instruction transmitted from the AP 140. Thereafter, the camera 120 and the camera 125 may generate multiple camera-data based on the first intermediary-instructions, and transmit the multiple camera-data to the IPU 130 through the second data link 153. Afterward, the IPU 130 may generate one or more second intermediary-instructions (or third control instructions) based on the camera-data supplied from the camera 120 and the camera 125, and transmit the third control instructions to the camera 120 through the second control link 151 and/or the camera 125 through the third control link 156. The IPU 130 may repeatedly perform the operation of generating the third control instructions based on the camera-data supplied from the camera 120 and the camera 125, and transmitting the third control instructions to the camera 120 and the camera 125. In this way, the IPU 130 may continue to operate the camera 120 and the camera 125 while the AP 140 does not participate.

Using the camera 120 as an example, the IPU 130 may receive from the camera 120 via the second data link 153 certain "image-capturing parameters" as camera-data. The image-capturing parameters may include one or more of the following parameters: aperture setting, shutter setting, exposure setting, ISO setting, white balance, image size, frame rate, as well as other control parameters required for the capturing of an image by the camera 120. Based on these image-capturing parameters, the IPU 130 may generate one or more third control instructions, and send these third control instructions to the camera 120 and/or the camera 125 for adjusting their respective image-capturing parameters or capturing images. In this way, the IPU 130 can not only actively set the image-capturing parameters of the camera 120 and/or the camera 125, but also further adjust the cameras 120 and 125 in accordance with the feedback received from the camera 120 (such as the current light intensity, aperture size, etc.) without requiring the AP 140 to issue any of the controlling instructions.

In some embodiments, the AP 140 may control the operations of the cameras 120 and 125 without sending any AP-instructions that trigger the IPU 130 to generate the intermediary-instructions. Specifically, based on an assumption or understanding of the needs of the AP 140, the IPU 130 may independently generate one or more intermediary-instructions and transmit them to the cameras 120 and 125. In other words, without receiving any AP-instructions from the AP 140, the IPU 130 may generate and transmit intermediary-instructions to the cameras 120 and 125, and the cameras 120 and 125 may transmit camera-data generated according to the intermediary-instructions back to the IPU 130. The IPU 130 may then generate intermediary-data based on the camera-data, and transmit the intermediary-data to the AP 140.

For example, the electronic device 110 may intend the cameras 120 and 125 to continue adjusting, in order to keep focusing on a moving subject and providing real-time images (e.g., LiveView function) at all times. In this situation, the IPU 130 may, at regular intervals without receiving any AP-instruction, send a sequence of "adjusting focus" intermediary-instructions to the camera 120, and send a sequence of "capturing images" intermediary-instructions to the camera 125. Based on each of the "capturing images" intermediary-instructions, the camera 125 may quickly generate an image and supply it to the IPU 130. The IPU 130 may then evaluate the image to determine whether in or out of focus, and transmit a corresponding "adjusting focus" intermediary-instruction to the cameras 120 and 125. Every time the focus is readjusted, the IPU 130 may repeat the above operations, and transmit the sequence of images from the camera 125 as the intermediary-data to the AP 140 for providing a live view feature on the electronic device 110. Thus, the IPU 130 can further reduce the burden on the AP 140 by improving the AP 140's image acquisition efficiency and optimizing the electronic device 110's overall performance.

In some embodiments, IPU 130 or AP 140 may control the data transfer direction of the bi-directional first control link 154 in accordance with control instructions. Assuming that the direction of data transmission from the AP 140 to the IPU 130 is "first transmission direction", the direction of data transmission from the IPU 130 to the AP 140 is "second transmission direction", the AP 140 may transmit a control instruction to the IPU 130 through the first control link 152. The control instruction may include the direction of transmission for clarifying whether the data transmission of the first data link 154 is the first transmission direction or the second transmission direction. Thus, the IPU 130 can listen to the control instruction to determine whether the first control link 154 is used to transmit data or receive data.

In some embodiments, the IPU 130 or AP 140 may automatically determine the direction of transmission for the first data link 154 without relying on control instructions in accordance based on a pre-arranged "transmission scheme." For example, the first data link 154 may be used for transmission in the first transmission direction when the system time is an odd timestamp (e.g., in millisecond), and may be used for transmission in the second transmission direction when the system time is an even timestamp. Additionally, the AP 140 can embed different transmission schemes into one control instruction and send the control instructions to the IPU 130 via the first control link 152.

In some embodiments, IPU 130 and AP 140 may utilize the bi-directional first data link 154 to perform some synchronous or asynchronous data processing functions. Through the control instructions transmitted by the first control link 152, the AP 140 may share some of its data processing tasks with the IPU 130. For example, when the AP 140 performs a decoding process on a frame of image, it may transmit a portion of the frame image to the IPU 130 through the first data link 154 in a first direction. While the IPU 130 processes the partial image (substantially simultaneous), the AP 140 may synchronously process other portions of the same frame image. After the IPU 130 sends the processed portion of the decoded image to the AP 140 through the first data link 154 in a second direction that is opposite to the first direction, the AP 140 may combine it with another portion of the decoded image processed by itself to generate a complete decoded image of one frame.

In some embodiments, through the control instructions transmitted by the first control link 152, the AP 140 can request the IPU 130 to perform data processing operations that cannot be perform by itself. For example, assuming an image is encoded using H.265 standard, the IPU 130 can perform H.265 encoding and/or decoding but the AP 140 cannot. In this case, the AP 140 may transmit the image to the IPU 130 through the first data link 154 in the first direction, and request the IPU 130 to decode it. After the IPU 130 decodes the image according to the control instruction, it may send the decoded image to the AP 140 through the first data link 154 in the second direction. The AP 140 may further perform additional operation on the image (such as color adjustment), and may send the processed image to the IPU 130 through the first data link 154 again in the first direction, requesting the IPU 130 to perform H.265 encoding. Thereafter, the IPU 130 may perform H.265 encoding on the received image according to the control instruction, and then transmit the encoded image to the AP 140 through the first data link 154 in the second direction.

In some embodiments, the IPU 130 may also utilize the AP 140 to share processing tasks or to perform tasks that it itself cannot complete. For example, the IPU 130 may send a "data processing instruction" or data that needs to be processed to AP 140 via the first data link 154. The AP 140 may cooperate with the IPU 130 to synchronously or asynchronously process the data in accordance with the received data processing instructions. Similar to the above embodiment, the IPU 130 may process different portions of the same image simultaneously with the AP 140, or the IPU 130 may cause the AP 140 to asynchronously complete H.265 encoding and decoding function the IPU 130 is unable to perform.

FIG. 2-A shows an electronic device architecture that allows multiple cameras being simultaneously controlled by an image-processing unit and an application processor, according to certain embodiments of the present disclosure. The modules and components in FIG. 2-A may correspond to their respective counterparts in FIG. 1, without all other components in FIG. 1 being shown. Specifically, in FIG. 1, the IPU 130 may directly control the camera 120 and the camera 125, while the AP 140 may not directly control the cameras 120 and 125. In contrast, in FIG. 2-A, the AP 140 and/or the IPU 130 may both have the capability to directly control the camera 120 and the camera 125. In addition, the AP 140 and the IPU 130 may cooperate with each other to share the operations of controlling the cameras 120 and 125 and processing the camera-data generated by the camera 120. The term "simultaneous processing" may refer to the separate, concurrent, and/or in-parallel processing of two or more operations that are not depended or related among themselves, and are occurring at the same time or substantially the same time. The term "sequential processing" may refer to the one-by-one processing of multiple operations that are depended or related.

In FIG. 2-A, the IPU 130 may be connected to the AP 140 through the first control link 152; the IPU 130 may be connected to the camera 120 through the second control link 151, and the IPU 130 may be connected to the camera 125 through the third control link 156. The AP 140 may be further connected to the camera 120 via a fourth control link 211, and may be connected to the camera 125 via a fifth control link 212. In a different embodiment, the fourth control link 211 and the fifth control link 212 in the FIG. 2-A may both be present, or may have one present with the other one not present/implemented.

In some embodiments, the first control link 152, the fourth control link 211, and the fifth control link 21 may be connected to the instruction-transmitting-interface of the AP 140 simultaneously; the second control link 151 and the fourth control link 211 may be connected to the instruction-receiving-interface of the camera 120 simultaneously; and the third control link 156 and the fifth control link 212 may be connected to the instruction-receiving-interface of the camera 125 simultaneously. In this way, the AP-instruction issued from the AP 140 may be transmitted to the IPU 130, the camera 120, and/or the camera 125 simultaneously or almost simultaneously through the first control link 152, the fourth control link 211, and the fifth control link 212 respectively.

In some embodiments, the AP 140 and the IPU 130 may be simultaneously involved in the manipulation of the cameras 120 and 125. In one situation, the AP 140 may transmit an AP-instruction to the camera 120 through the fourth control link 211, the IPU 130 may generate one or more intermediary-instructions based on the AP-instruction received through the first control link 152, and send the intermediary-instructions to the camera 120 via the second control link 151. Alternatively, the IPU 130 may evaluate the AP-instruction received through the first control link 152 and determine whether or not to coordinate with the AP 140 during the controlling of the cameras 120 and 125.

In some embodiments, using the camera 120 as an example, the camera 120 may receive AP-instruction from AP 140 and/or the intermediary-instruction from the IPU 130. Since the IPU 130 may take some time to generate the intermediary-instruction, the camera 120 may first receive the AP-instruction and then the intermediary-instruction with a little delay. The camera 120 may be able to generate the corresponding camera-data based on the received AP-instruction and the subsequently received intermediary-instruction.

In some embodiments, the IPU 130 does not immediately participate in the manipulation of the cameras 120 and 125, and may only participate in the subsequent manipulation of the cameras 120 and 125, as well as in the processing of the camera-data generated by the cameras 120 and 125. Specifically, after the IPU 130 receives the AP-instruction via the first control link 152, it does not at first generate or transmit any intermediary-instruction. In this case, the camera 120 and the camera 125 receive only the AP-instruction without the intermediary-instruction, and may generate the corresponding camera-data according to the AP-instruction. The IPU 130 may then process and optimize the camera-data according to the AP-instruction, and generate subsequent intermediary-instructions for transmitting to the cameras 120 and 125 for further operations.

In some embodiments, the AP 140 may transmit a "terminate" AP-instruction to the IPU 130 for stopping the IPU 130 from performing some or all of its instruction-processing functions. Once terminated, the IPU 130 may no longer transmit any intermediary-instruction to the camera 120, and the AP 140 can still directly transmit the AP-instruction to the cameras 120 and 125 through the fourth control link 211 and/or the fifth control link 212. In other cases, when the IPU 130 is damaged and its instruction-processing function is disabled, the AP 140 can still control the cameras 120 and 125, thereby improving the overall system performance of the electronic device 110.

In some embodiments, the architecture in FIG. 2-A may be adapted by an AP 140 which is designed to control and support a single camera 120. By utilizing the architecture in FIG. 2-A, the electronic device 110 may be able to control and support multiple cameras 120 and 125. Thus, the IPU 130 can greatly enhance the overall image-processing performance of the electronic device 110, without impacting any existing functions that can be performed by the AP 140 and/or the cameras 120 and 125. Specifically, the AP 140 can still individually control the camera 120 or the camera 125 via the fourth control link 211 or the fifth control link 212. By adding the IPU 130, the AP 140 can delegate some of its functions to the IPU 130, in the meantime acquire additional functions that are not previously supported by the AP 140.

FIG. 2-B shows an electronic device architecture that allows an application processor and an image-processing unit to simultaneously process image data generated from multiple cameras, according to certain embodiments of the present disclosure. The modules and components in FIG. 2-B may correspond to their respective counterparts in FIG.

1, without all other components in FIG. 1 being shown. Specifically, in FIG. 1, the IPU 130 may directly receive camera-data from the camera 120 and the camera 125, while the AP 140 may not directly receive such camera-data from the cameras 120 and 125. In contrast, in FIG. 2-B, the AP 140 and the IPU 130 may both directly receive camera-data from the camera 120 and the camera 125. In addition, the AP 140 and the IPU 130 may cooperate with each other to share the processing of the camera-data generated by the cameras 120 and 125.

In FIG. 2-B, the IPU 130 may be connected to the AP 140 through the first data link 154; the IPU 130 may be connected to the camera 120 through the second data link 153; and the IPU 130 may be connected to the camera 125 via the third data link 157. The AP 140 may be further connected to the camera 120 via a fourth data link 221, and connected to the camera 125 through a fifth data link 222. In a different embodiment, the fourth control link 221 and the fifth data link 222 may both be present, or may have one present with the other one not present/implemented.

In some embodiments, the first data link 152, the fourth data link 221, and the fifth data link 222 may be connected to the data-receiving-interface of the AP 140 simultaneously; the second data link 153 and the fourth data link 221 may be connected to the data-transmitting-interface of the camera 120 simultaneously; and the third data link 157 and the fifth data link 222 may be connected to the data-transmitting-interface of the camera 125 simultaneously. In this way, camera-data from the cameras 120 may be transmitted to the IPU 130 and the AP 140 simultaneously or almost simultaneously through the second data link 153 and the fourth data link 221 respectively. And camera-data from the cameras 125 may be transmitted to the IPU 130 and the AP 140 simultaneously or almost simultaneously through the third data link 157 and the fifth data link 222 respectively.

In some embodiments, both the AP 140 and the IPU 130 may directly receive camera-data from the camera 120 and/or the camera 125. The IPU 130 may determine whether or not to process the camera-data received from the second data link 153 based on the AP-instruction received through the first control link 152. In some cases, the IPU 130 may generate one or more intermediary-data based on the camera-data, and send the intermediary-data to the AP 140 through the first data link 154. Since the IPU 130 may take time to generate the intermediary-data, the AP 140 may first receive the camera-data and then the intermediary-data with a little delay. Likewise, the AP 140 and the IPU 130 may receive camera-data from the camera 125 in a similar fashion.

In some embodiments, the IPU 130 does not participate in the processing of the camera-data by the AP 140. Specifically, the IPU 130 may evaluate the camera-data received from the second data link 153, and does not generate the intermediary-data. In this case, the AP 140 will only receive the camera-data without receiving the intermediary-data. In other embodiments, the AP 140 may transmit a "terminate" AP-instruction through the first control link 152 to the IPU 130 for stopping some or all of its data-processing functions. In this way, the IPU 130 no longer transmits any intermediary-data to the AP 140, and the AP 140 can still directly receive the camera-data transmitted by the camera 120 and/or the camera 125 through the fourth data link 221 and/or the fifth data link 222. When the IPU 130 is damaged and has some of its data-processing function failed, stopping the data-processing function of the IPU 130 ensures that the AP 140 can still directly receive the camera-data transmitted by the cameras 120 and 125, thereby increasing the electronic device 110 overall system performance.

In some embodiments, the architecture in FIG. 2-B may be adapted by an AP 140 which is designed to control and support a single camera 120. By utilizing the architecture in FIG. 2-B, the IPU 130 can greatly enhance the overall image-processing performance of the electronic device 110, without impacting any existing functions that can be performed by the AP 140 and the cameras 120 and 125.

Figure 3:
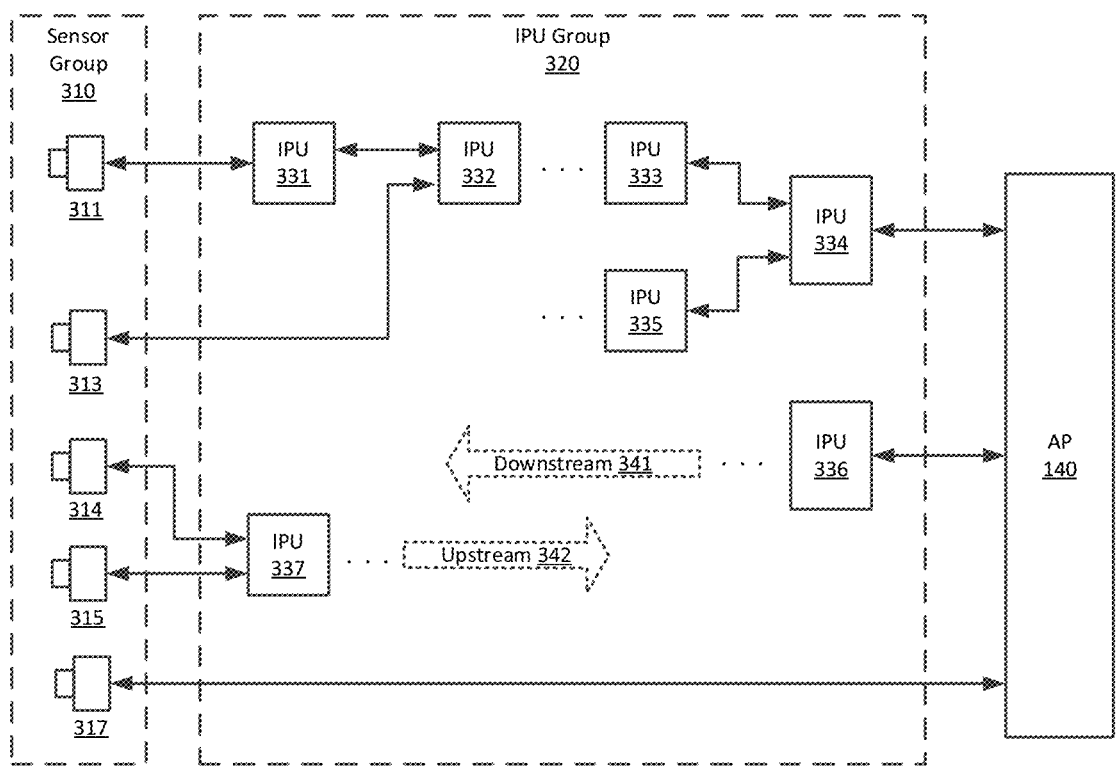
FIG. 3 shows an electronic device architecture that allows an application processor to interact with multiple cameras via an image-processing-unit group.

FIG. 3 shows an electronic device architecture that allows an application processor to interact with multiple cameras via an image-processing-unit group, according to certain embodiments of the present disclosure. The modules and components in FIG. 3 may correspond to their respective counterparts in FIG. 1, without all other components in FIG. 1 being shown. In FIG. 3, the AP 140 may be configured to control and communicate with a sensor group 310 using an IPU group 320. Specifically, the sensor group 310 may contain multiple identical or different sensors (e.g., cameras) including exemplary sensors 311, 313, 314, 315, and 317. The IPU group 320 may contain a hierarchy of identical or different IPUs including exemplary IPUs 331, 332, 333, 334, 335, 336, and 337.

In some embodiments, each of the IPUs in FIG. 3 may be an IPU 130 of FIG. 1 designed to connect with one AP 140 and at least two cameras 120 and 125. In other words, each IPU may have one instruction-receiving-interface for receiving "input instructions", and two instruction-transmitting-interfaces (referred to as a first instruction-transmitting-interface and a second instruction-transmitting-interface) for transmitting "output instructions". Further, each IPU may have two data-receiving-interfaces (referred to as a first data-receiving-interface and a second data-receiving-interface) for receiving "input data", and one data-transmitting-interface for transmitting "output data".

In some embodiments, a first IPU's instruction-transmitting-interface may be connected with a second IPU's instruction-receiving-interface using a control link, allowing the first IPU's output instruction to be transmitted to the second IPU as its input instruction via this control link. Likewise, the first IPU's data-receiving-interface may be connected with the second IPU's data-transmitting-interface using a data link, allowing the second IPU's output data to be transmitted to the first IPU as its input data via this data link. Please note that in the above configuration, instructions are transmitted from the first IPU to the second IPU, while data are transmitted in an opposite direction from the second IPU to the first IPU. Thus, for simplicity purposes, the above-described control link and data link between the first IPU and the second IPU may be represented in FIG. 3 by a single double-arrow line between the two IPUs. In other words, each double-arrow line in FIG. 3 may include a corresponding control link and a corresponding data link, as illustrated in FIG. 1.

In some embodiments, as shown in FIG. 3, IPU 331 may be connected with a camera 311 in a similar fashion as the IPU 130 being connected with the camera 120 in FIG. 1; IPU 337 may be connected with two cameras 314 and 315 in a similar fashion as the IPU 130 being connected with the cameras 120 and 125 in FIG. 1; and IPU 334 may be connected with the A 140 in a similar fashion as the IPU 130 being connected with the AP 140 in FIG. 1. Further, an IPU in FIG. 3 may be connected with multiple other IPUs in a similar fashion as being connected with multiple cameras, and may be connected with another IPU in a similar fashion as being connected with the AP 140. For example, IPU 334 may be similarly connected with IPUs 333 and 335 as the IPU 337 being connected with cameras 314 and 315, and IPU 331 may be connected with the IPU 332 similar to IPU 334 connecting with AP 140. Also, IPU 332 may be directly connected with IPUs 331 as well as a camera 313.

In some embodiments, multiple IPUs may be inter-connected to form an IPU group 320, which may be a hierarchical structure of IPUs. In an IPU group, at least one of its IPUs may be connected with an AP 140. Such an IPU may be referred to as a "root" IPU. In FIG. 3's example, the IPU 334 and 336 may be deemed root IPUs. Further, each IPU in the IPU group 320 may be connected with at least one another IPU in the IPU group 320, and each sensor in the sensor group 310 may be connected with one of the IPUs in the IPU group 320.

In some embodiments, when a first IPU is connected to a second IPU, with instructions being transmitted from the first IPU to the second IPU and data being transmitted from the second IPU to the first IPU, the first IPU may be referred to as a "parent" IPU of the second IPU, and the second IPU may be referred to as a "child" IPU of the first IPU. In this case, a direction of data transmitting from a parent IPU to a child IPU may be referred to as a "downstream" direction, and a direction of data transmitting from a child IPU to a parent IPU may be referred to as an "upstream" direction.

In some embodiments, the AP 140 may be a processing unit designed to support a single camera. In this case, the AP 140 may be connected with the root IPU 334 of the IPU group 320, which may include a tree-structure of IPUs directly or indirectly being the child IPUs of the root IPU 334. Further, the child IPUs in the IPU group 320 may be configured to support any arbitrary number of sensors in the sensor group 310, thereby allowing the AP 140, which may not support direct control of or communication with these sensors, to interact with these sensors. Thus, instructions originated and sent from the AP 140 may be transmitted downstream 341 through the IPUs in the IPU group 320, before being delivered to the sensors in the sensor group 310. Likewise, data gathered by the sensors in the sensor group 310 may be transmitted upstream through the IPUs in the IPU group 320, and being returned back to the AP 140 in response to the instructions it originally sent.

In some embodiments, the AP 140 may be a processing unit designed to support two cameras. In this case, the AP 140 may be connected with the root IPU 334 and the root IPU 336 of the IPU group 320. Alternatively, the AP 140 may be connected with one root IPU and directly with a specific sensor in the sensor group 310. For example, the AP 140 may be connected with the root IPU 336 and the sensor 317. In this case, the AP 140 may receive camera-data from the camera 317, and receive from the IPU 336 intermediary-data which are being processed by various IPUs in the IPU group 320. Thus, the AP 140 may have various options to process the camera-data and the intermediary-data, ignore the camera-data or the intermediary-data, compare the camera-data with the intermediary-data, or generate additional data based on the camera-data and the intermediary-data.

In some embodiments, the architecture in FIG. 3 may be adapted by any AP 140 which is designed to control and support one camera or two cameras. By utilizing the architecture in FIG. 3, the AP 140 may treat the IPU group 320 as one of the two cameras 120, and can utilize the IPU group 320 to greatly enhance the overall image-processing performance of the electronic device 110. Further, the AP 140 can also simultaneously utilize this network of IPUs in the IPU group 320, either control individual IPUs or rely on these IPUs to perform some of its own functions or additional functions that are not supported by the AP 140.

In some embodiments, in the IPU group 320, instructions may be transmitted downstream 341 from the AP 140 and/or some IPUs contained therein toward the sensors in the sensor group 320, while data may be transmitted upstream 342 from the sensors and/or some IPUs contained therein toward the AP 140. When some of the IPUs support bi-directional data link, certain data generated by the AP 140 and/or IPUs may also be transmitted downstream 341. Thus, the IPUs in the IPU group 320 may be able to process data from downstream 341 as well as from upstream 342, thereby allowing the IPU group 320 to maximize the utilizations of the capabilities of the IPUs.

Figure 4:
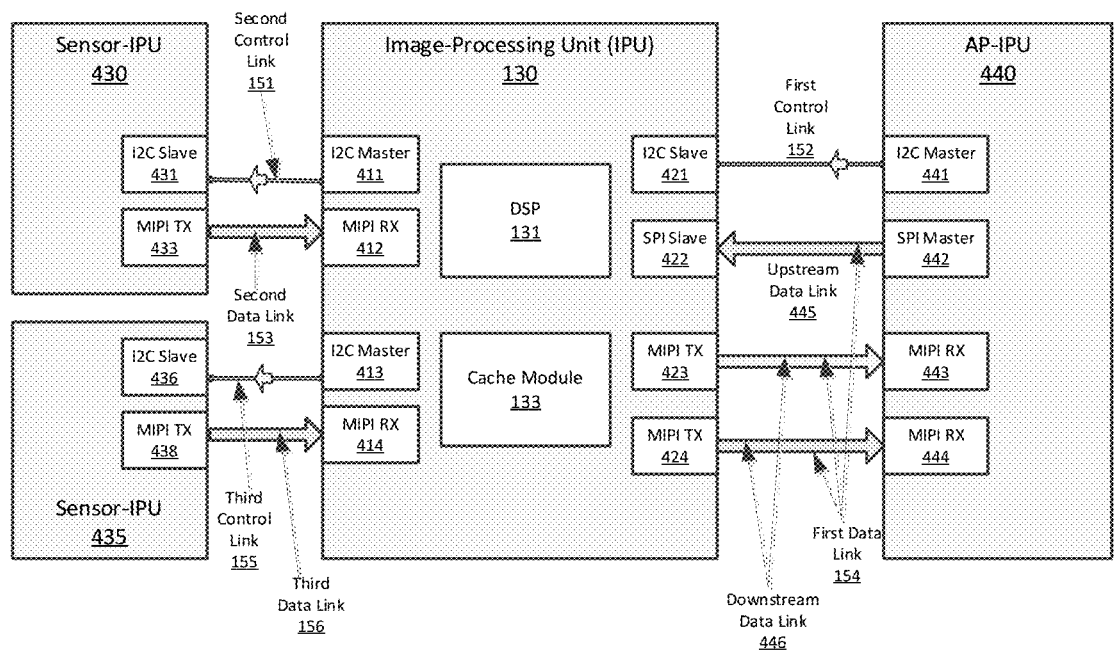
FIG. 4 shows a schematic view of an image-processing unit.

FIG. 4 shows a schematic view of an image-processing unit, according to certain embodiments of the present disclosure. The modules and components in FIG. 4 may correspond to their respective counterparts in FIG. 1. In FIG. 4, the IPU 130 may be directly connected with an AP 140 or one or more cameras 430, and 435. When being used in an IPU group (as shown in FIG. 3), the IPU 130 may also be connected with a parent IPU 440 and/or one or two child IPUs 430 and 435. Thus, Boxes 430 and 435 may be deemed as "Sensor-IPU", while box 440 may be deemed as 'AP-IPU".

In some embodiments, the IPU 130 may include an instruction-receiving-interface 421 for receiving instructions from an AP-IPU 440, and a data-transmitting-interface 422 for receiving upstream data from the AP-IPU 440. The IPU 130 may also include a instruction-transmitting-interface 411 for transmitting intermediary-instructions to the sensor-IPU 430, and a data-receiving-interface 412 for receiving data from the sensor-IPU 430. Further, the IPU 130 may include an instruction-transmitting-interface 413 for transmitting intermediary-instructions to another sensor 125, and a data interface 414 for receiving data from a second sensor-IPU 435. The IPU 130 may then process the data from the sensor-IPU 430 and 435, and transmit the processed data via a data-transmitting-interface 423 and 424 to the AP-IPU 440.

In some embodiments, the AP-IPU 440 may include a instruction-transmitting-interface 441 for transmitting instructions to the IPU 130 (via a first control link 152), and a data-transmitting-interface 442 for transmitting data to the IPU 130. The AP 140 may also include a data-receiving-interface 443 for receiving data associated with the sensor-IPU 430, and a data-receiving-interface 444 for receiving data from the sensor-IPU 435.

In some embodiments, the IPU 130 of FIG. 4 may be configured to support multiple sensors and/or child IPUs, even if the AP 140 can by itself only support one or two cameras. Specifically, the IPU 130 may be configured to transmit an intermediary-instruction to the sensor-IPU 430 via a second control link 155, process the sensor-data received from the sensor-IPU 430 via a second data link 153, and provide intermediary-data to the AP-IPU 440 for further processing via two downstream data links 446. Thus, an AP 140 that does not support any of the sensors may nevertheless interact with these sensors by incorporating the help of the IPU 130.

In some embodiments, when the IPU 130 is connected with two or more sensor-IPUs 330 and 335, the IPU 130 may generate multiple identical or different intermediary-instructions for these sensor-IPUs 330 and 335 based on the same instruction provided by the AP-IPU 440. The IPU 130 may simultaneously transmit these multiple intermediary-instructions to their respective sensor-IPUs 330 and 335. Further, the IPU 130 may receive a set of data from these sensor-IPUs 330 and 335 in response to the intermediary-instructions, and generate intermediary-data based on these set of camera-data. Afterward, the IPU 130 may transmit the intermediary-data to the AP-IPU 440 in response to its prior instruction.

Figure 5:
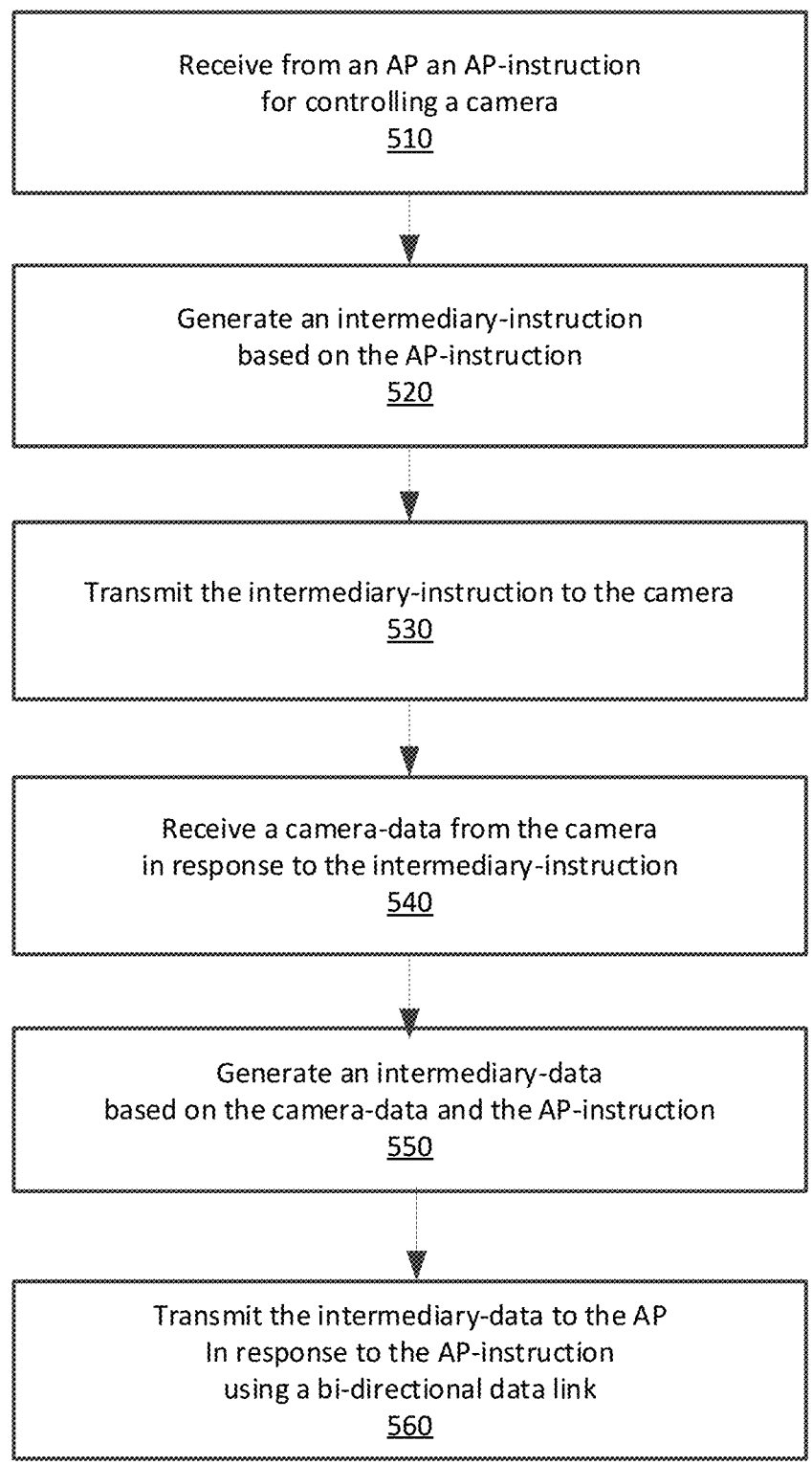
FIG. 5 shows a flow diagram illustrating a process for providing image-processing functionality to an electronic device.

FIG. 5 shows a flow diagram illustrating a process for providing image-processing functionality to an electronic device, in accordance to certain embodiments of the present disclosure. The process sets forth various functional blocks or actions (as shown in e.g., 510, 520, and 530 etc.) that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 510, an image-processing unit (IPU) of the electronic device may receive, from an application processor (AP) in the electronic device, an AP-instruction for controlling a camera in the electronic device. In some embodiments, the camera may or may not support the AP-instruction.

At block 520, the IPU may generate an intermediary-instruction based on the AP-instruction. In some embodiments, the intermediary-instruction may be the same as or different from the AP-instruction. Further, the camera may support the intermediary-instruction. Further, the image-processing image may execute a plug-in to process the AP-instruction and generate the intermediary-instruction.

In some embodiments, the IPU may generate a plurality of control instructions as the intermediary-instruction. Specifically, each of the plurality of control instructions may be configured to control the camera in performing a corresponding operation. For example, each of the plurality of control instructions may control the camera to capture a corresponding image.

At block 530, the IPU may transmit the intermediary-instruction to the camera. From the perspective of the camera, the IPU may act as the AP.

At block 540, the IPU may receive a camera-data from the camera in response to the intermediary-instruction. In some embodiments, the IPU may receive a plurality of images generated by the camera in response to the plurality of control instructions in the intermediary-instruction.

At block 550, the IPU may generate an intermediary-data based on the camera-data and the AP-instruction. In some embodiments, the intermediary-data, which may include a single image, may be generated based on the plurality of images. Further, the IPU may utilize a DSP to execute a plug-in to generate the intermediary-data.

At block 560, the IPU may transmit the intermediary-data to the AP in response to the AP-instruction. From the perspective of the AP, the intermediary-data may be deemed as if the AP transmitted the AP-instruction to the camera and received the intermediary-data from the camera. Further, the IPU may transmit the intermediary-data using a bi-directional data link between the IPU and the AP. And the AP is configured to transmit AP-data to the IPU using the bi-directional data link.

Systems and methods for utilizing an image-processing unit to support an application processor have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable storage medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, modules and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. An image-processing unit for an electronic device, comprising:
a digital signal processor (DSP);
a first control interface configured for receiving an AP-instruction from an application processor (AP) external to the image-processing unit;
a second control interface configured for transmitting an intermediary-instruction to a sensor external to the image-processing unit, wherein the intermediary-instruction is generated by the DSP based on the AP-instruction, and the intermediary-instruction is configured to control the sensor:
a first data interface configured for receiving sensor-data, wherein the sensor-data is generated by the sensor in response to the intermediary-instruction from the DSP; and
a second data interface configured for bi-directionally transmitting intermediary-data to the AP or receiving AP-data from the AP, wherein the intermediary-data is generated by the DSP based on the sensor-data, and the AP is configured to process the intermediary-data.

2. The image-processing unit as recited in claim 1, wherein the AP generates the AP-data based on the received intermediary-data.

3. The image-processing unit as recited in claim 1, wherein the AP-data contain information that cannot be processed by the AP but can be processed by the image-processing unit.

4. The image-processing unit as recited in claim 1, wherein the AP and the image-processing unit synchronously process the AP-data.

5. An electronic device, comprising:
a first camera and a second camera;
an application processor (AP); and
an image-processing unit (IPU) coupled with the first camera, the second camera, and the AP, wherein the IPU is configured to
receive a first AP-instruction from the AP for controlling the first camera and the second camera,
generate a first intermediary-instruction and a second intermediary-instruction based on the first AP-instruction, wherein the first intermediary-instruction is configured to control the first camera, and the second intermediary-instruction is configured to control the second camera,
transmit the first intermediary-instruction to the first camera,
transmit the second intermediary-instruction to the second camera,
receive a first camera-data from the first camera in response to the first intermediary-instruction,
receive a second camera-data from the second camera in response to the second intermediary-instruction,
generate a first intermediary-data based on the first camera-data, the second camera-data, and the first AP-instruction, and
transmit the first intermediary-data to the AP in response to the first AP-instruction, wherein the AP is configured to process the first intermediary-data.

6. The electronic device as recited in claim 5, wherein the AP is configured to transmit the first AP-instruction directly to the first camera without utilizing the IPU.

7. The electronic device as recited in claim 5, wherein the AP is configured to receive the first camera-data directly from the first camera without utilizing the IPU.

8. The electronic device as recited in claim 5, wherein the AP is configured to transmit AP-data to the IPU, and the IPU is configured to generate second intermediary-data based on the AP-data.

9. The electronic device as recited in claim 5, wherein the AP-data is generated by the AP based on the first intermediary-data received from the IPU.

10. A method for providing image-processing functionality to an electronic device, the method comprising:
receiving, by an image-processing unit (IPU) of the electronic device from an application processor (AP), an AP-instruction for controlling a camera in the electronic device;
generating, by the IPU, an intermediary-instruction based on the AP-instruction, wherein the intermediary-instruction is configured to control the camera:
transmitting, by the image-processing unit, the intermediary-instruction to the camera;
receiving, by the image-processing unit, a camera-data from the camera in response to the intermediary-instruction;
generating, by the image-processing unit, an intermediary-data based on the camera-data and the AP-instruction; and
transmitting, by the image-processing unit, the intermediary-data to the AP in response to the AP-instruction using a bi-directional data link between the IPU and the AP, wherein the AP is configured to transmit AP-data to the IPU using the bi-directional data link, and the AP is configured to process the intermediary-data.

11. The method as recited in claim 10, wherein the generating of the intermediary-instruction based on the AP-instruction comprises:
generating a plurality of control instructions as the intermediary-instruction, wherein each of the plurality of control instructions is configured to control the camera in performing a corresponding operation.

12. The method as recited in claim 10, wherein the generating of the intermediary-data based on the camera-data comprises:
receiving a plurality of images generated by the camera in response to the plurality of control instruction; and
generating the intermediary-data based on the plurality of images.

13. An electronic device, comprising:
a sensor group containing a plurality of sensors;
an application processor (AP); and
an image-processing unit (IPU) group coupled with the plurality of sensors and the AP, wherein
the IPU group contains a plurality of IPUs,
the AP is connected with a first IPU selected from the plurality of IPUs,
each of the plurality of sensors is connected with one of the plurality of IPUs,
each one of the plurality of IPUs is configured to connect with at least one of the plurality of IPUs,
and the IPU group is configured to
receive, by the first IPU, an AP-instruction from the AP for controlling the plurality of sensors,
generate a plurality of intermediary-instructions based on the first AP-instruction, wherein each of the plurality of intermediary-instructions is configured to control a corresponding one of the plurality of sensors, transmit the plurality of intermediary-instructions from the first IPU to the plurality of sensors via the plurality of IPUs, receive sensor-data from the plurality of sensors in response to the plurality of intermediary-instructions, generate a plurality of intermediary-data based on the plurality of sensor-data and the first AP-instruction, and transmit the plurality of sensor-data to the AP via the plurality of the IPUs.

\* \* \* \* \*